United States Patent
Dutta et al.

(10) Patent No.: US 10,066,162 B2
(45) Date of Patent: Sep. 4, 2018

(54) PHOSPHOR BLEND AND FLUORESCENT LAMP CONTAINING SAME

(75) Inventors: Arunava Dutta, Winchester, MA (US); Paul Salvi, Versailles, KY (US); Carissa Mercer, Shadyside, OH (US)

(73) Assignee: LEDVANCE LLC, Wilmington, MA (US)

( * ) Notice: Subject to any disclaimer, the term of this patent is extended or adjusted under 35 U.S.C. 154(b) by 236 days.

(21) Appl. No.: 13/265,807

(22) PCT Filed: Apr. 27, 2010

(86) PCT No.: PCT/US2010/032521
§ 371 (c)(1),
(2), (4) Date: Oct. 21, 2011

(87) PCT Pub. No.: WO2010/126869
PCT Pub. Date: Nov. 4, 2010

(65) Prior Publication Data
US 2012/0032580 A1    Feb. 9, 2012

Related U.S. Application Data

(60) Provisional application No. 61/174,808, filed on May 1, 2009.

(51) Int. Cl.
*H01J 61/44* (2006.01)
*C09K 11/81* (2006.01)
(Continued)

(52) U.S. Cl.
CPC ........ *C09K 11/7739* (2013.01); *C09K 11/778* (2013.01); *C09K 11/7729* (2013.01);
(Continued)

(58) Field of Classification Search
CPC .................. C09K 11/7777; H01J 61/44
See application file for complete search history.

(56) References Cited

U.S. PATENT DOCUMENTS

| 4,857,798 A * | 8/1989 | Ford ............................. 313/487 |
| 2005/0179364 A1* | 8/2005 | Murazaki ..................... 313/498 |

(Continued)

FOREIGN PATENT DOCUMENTS

| JP | 2004247074 A | 9/2004 |
| JP | 2007115467 A | 5/2007 |

(Continued)

OTHER PUBLICATIONS

Csaba A. Nemes, International Search Report and Written Opinion of the International Searching Authority for PCT/US10/32521, dated Jul. 8, 2010, pp. 1-8, European Patent Office, Rijswijk, The Netherlands.

*Primary Examiner* — Nimeshkumar Patel
*Assistant Examiner* — Jacob R Stern

(57) ABSTRACT

A phosphor blend is described wherein the blend consists of a red-emitting rare earth phosphor, a green-emitting rare earth phosphor, and a blue-emitting rare earth phosphor wherein the 50% size of the phosphors is between about 12 to 15 µm. The phosphor blend is incorporated into a fluorescent lamp having an increased efficacy. A dual layer coating may be used to provide an additional increase in efficacy.

15 Claims, 7 Drawing Sheets

(51) Int. Cl.
*C09K 11/78* (2006.01)
*C09K 11/77* (2006.01)

(52) U.S. Cl.
CPC ...... *C09K 11/7734* (2013.01); *C09K 11/7774* (2013.01); *C09K 11/7777* (2013.01); *H01J 61/44* (2013.01)

(56) References Cited

U.S. PATENT DOCUMENTS

2006/0267500 A1\* 11/2006 Chau et al. .................. 313/634
2009/0154195 A1   6/2009 Ishii et al.

FOREIGN PATENT DOCUMENTS

| | | |
|---|---|---|
| JP | 2007197478 A | 8/2007 |
| JP | 2008059943 A | 3/2008 |
| JP | 2009087627 A | 4/2009 |
| WO | 2007037339 A1 | 4/2007 |

\* cited by examiner

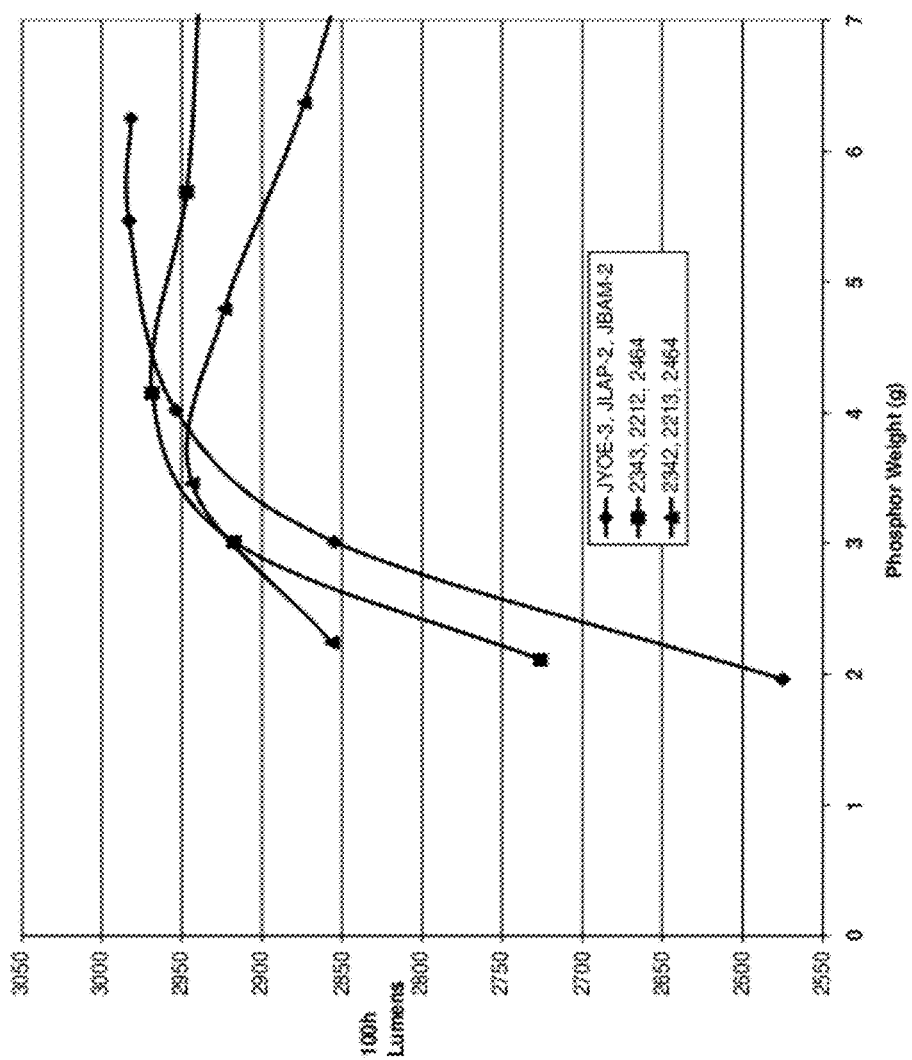

PHOSPHOR BLEND AND FLUORESCENT LAMP CONTAINING SAME

CROSS-REFERENCE TO RELATED APPLICATIONS

The present application claims priority of U.S. Provisional Application No. 61/174,808, filed May 1, 2009, and PCT Application No. PCT/US10/32521, filed Apr. 27, 2010, the entire contents of which are hereby incorporated by reference.

BACKGROUND OF THE INVENTION

The use of rare earth phosphors for general illumination fluorescent lamp applications is well known. Rare earth phosphors contain at least one rare earth element, typically as the activator ion (e.g., $Eu^{2+}$, $Tb^{3+}$, $Ce^{3+}$). Every manufacturer of such lamps uses rare earth phosphors to produce lamps with different levels of light output (lumens), color temperature (CCT) and CRI. Typical rare earth phosphors in commercial use for fluorescent lamps include the red-emitting $Y_2O_3$:Eu (YOE), the green-emitting $La(PO_4)$:Ce,Tb (LAP) and the blue-emitting $BaMgAl_{10}O_{17}$:Eu (BAM). Other green-emitting phosphors such as $(Ce,Tb)MgAl_{11}O_{19}$ (CAT) and $(Gd,Ce,Tb)MgB_5O_{10}$ (CBT) and blue-emitting phosphors such as $Sr_5(PO_4)_3$:Cl,Eu (SCAp) are also known to practitioners of the art.

While the use of rare earth phosphors in discharge lighting is well known, the trend in the industry has been to use to smaller and smaller size phosphors in order to reduce the powder weight needed for a given level of lumen output. However, it also has become increasingly desirable to produce higher efficacy light sources in order to reduce energy consumption and thereby reduce greenhouse gas emissions. A higher efficacy light source would have a higher LPW (lumens per watt of electrical power input). Using a fluorescent lamp with a higher LPW would reduce the consumption of electrical energy (KWh) for a given level of light output. Less consumption of electrical energy by consumers in all categories would result in a decrease in the quantity of fossil fuel usage at the electric power utilities. This in turn would lower the amount of $CO_2$ greenhouse gas generated by the combustion of fossil fuels.

SUMMARY OF THE INVENTION

This invention reverses the industry trend and employs the use of very large particle size rare earth phosphors (referred to herein as Jumbo phosphors) in order to obtain higher efficacy light sources, in particular higher efficacy fluorescent lamps. Moreover, it was unexpectedly found that the increase in lamp efficacy is greater when a dual layer of Jumbo phosphors is used as compared to the increase in efficacy obtained with a single layer of Jumbo phosphors.

In accordance with one aspect of the invention, there is provided a phosphor blend consisting of a red-emitting rare earth phosphor, a green-emitting rare earth phosphor, and a blue-emitting rare earth phosphor wherein the 50% size of the phosphors is between about 12 to 15 µm.

In accordance with another aspect of the invention, there is provided a fluorescent lamp comprising electrodes and a glass envelope having a phosphor coating on an interior surface, the envelope being hermetically sealed and containing an amount of mercury and an inert gas, the phosphor coating containing a phosphor blend consisting of a red-emitting rare earth phosphor, a green-emitting rare earth phosphor, and a blue-emitting rare earth phosphor wherein the 50% size of the phosphors is between about 12 to 15 µm.

BRIEF DESCRIPTION OF THE DRAWINGS

FIG. 4 is a graph of 100 h lumen output vs. powder weight for various phosphor blends.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Jumbo Phosphors: Physical Characteristics

The red, green and blue Jumbo phosphors JYOE, JLAP, JBAM have the same chemistry as the commercial red (YOE), green (LAP) and blue (BAM) phosphors that are used in fluorescent lamps, including types 2343 (YOE), 2212 (LAP) and 2464 (BAM) available from Global Tungsten & Powders Corp. of Towanda, Pa. For comparison purposes, the activator level and peak emission wavelengths of the Jumbo analogs of these phosphors are the same as the commercial controls. The primary difference resides in the particle size.

As used herein, all particle size measurements were made on a laser diffraction particle size analyzer (Malvern) system. The 50% size refers to the median volume based diameter, i.e., 50% by volume of the particles is larger than that size and 50% by volume is also less than that size.

In particular, the non-sonified (no ultrasonic dispersion) 50% size of the Jumbo red, green and blue phosphors is about 12-15 µm. By way of comparison, the standard red type 2343 phosphor and standard green type 2212 phosphor have non-sonified 50% sizes of 9-10 µm and the standard blue type 2464 phosphor has a non-sonified 50% size of about 7-8 µm. Such standard size phosphors are used as controls herein.

Figure 1A:
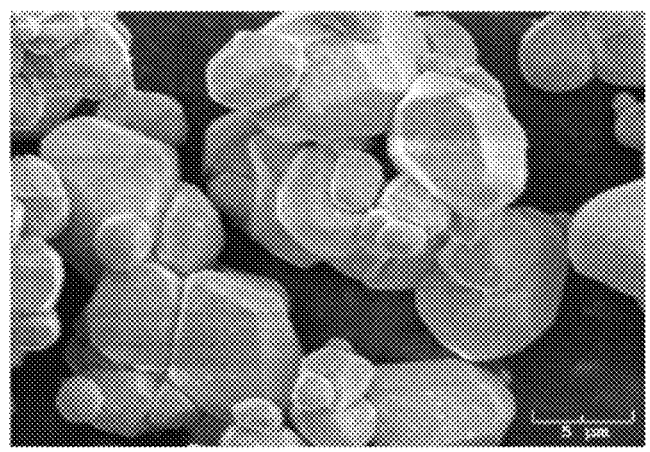
FIGS. 1A and 1B are SEM photomicrographs of red-emitting YOE Jumbo- and standard-sized phosphors, respectively.
Figure 1B:
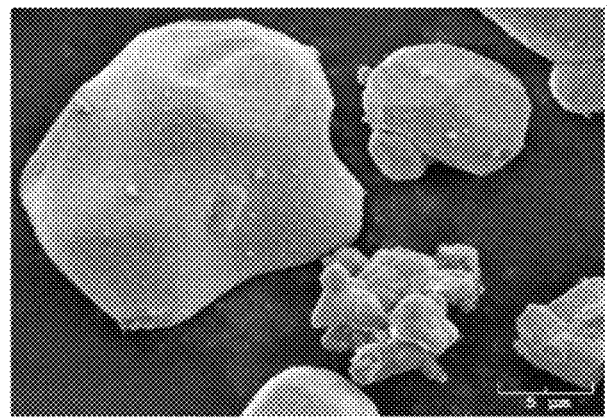
Figure 2A:
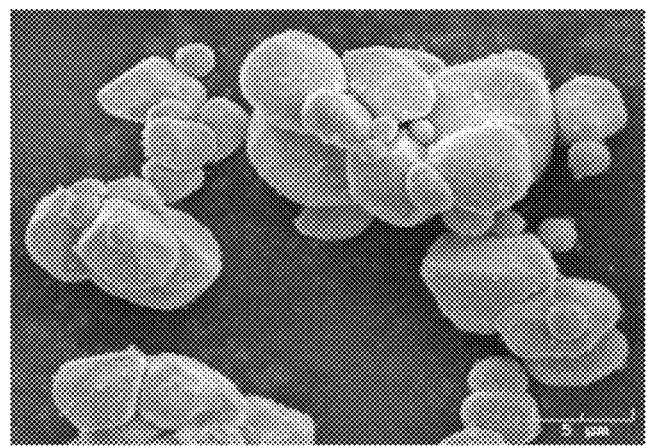
FIGS. 2A and 2B are SEM photomicrographs of green-emitting LAP Jumbo- and standard-sized phosphors, respectively.
Figure 2B:
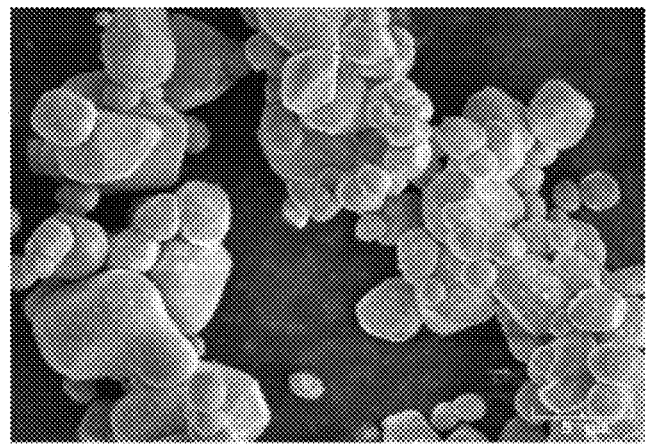
Figure 3A:
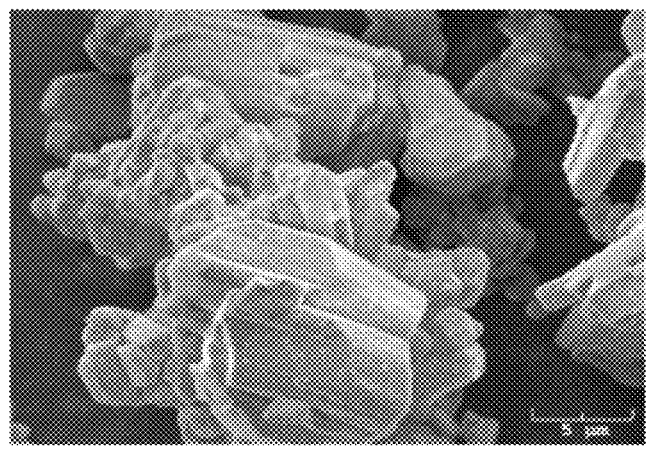
FIGS. 3A and 3B are SEM photomicrographs of blue-emitting BAM Jumbo- and standard-sized phosphors, respectively.
Figure 3B:
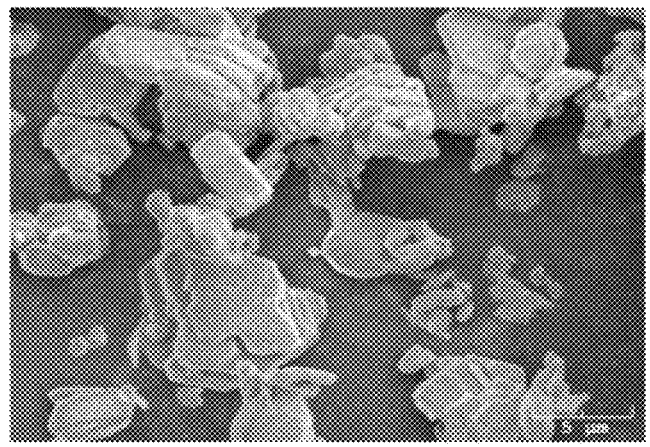

SEM photographs of the Jumbo rare earth phosphors compared to the standard commercial phosphors are shown in FIGS. 1-3.

Performance of Jumbo Phosphors in T8 Octron® Fluorescent Lamps

Powder weight series testing was performed in a T8 lamp configuration using the same precoat of aluminum oxide C (AOC) in each case. The only variable was the phosphor blend that was used. Three blends were tested: one using Jumbo phosphors, one using the standard size rare earth phosphors 2343 (YOE), 2212 (LAP) and 2464 (BAM) for the OSRAM SYLVANIA Octron® XPS lamp and one using the standard size rare earth phosphors 2342 (YOE), 2213 (LAP), 2464 (BAM) for the OSRAM SYLVANIA Octron® XP lamp which are smaller in particle size for the red- and green-emitting phosphors compared to those used for the Octron® XPS lamp. The 100 h color corrected lumens as a function of phosphor blend powder weight is shown in FIG. 4.

Several observations can be made from the information presented in FIG. 4. The maximum lumens that can be achieved is highest for the Jumbo phosphor blend. For both the other phosphor blends, the highest lumen output that can be achieved is lower than that possible with the Jumbo phosphors. The highest lumen output which also translates to the highest LPW (lumen per watt) or highest lamp efficacy is realized at about 6 g powder weight of Jumbo phosphor blend. For the other blends, the lumen output at a powder weight of 6 g is distinctly lower than that at the powder weights corresponding to the relevant local lumen maxima for these blends. In other words, merely increasing the powder weight of the smaller-sized phosphor blends to 6 g will not enable them to reach the maximum lumen or LPW level possible with the Jumbo phosphors. Gains of about 1.5% in lumens and LPW are realized with the Jumbo phosphors relative to the standard phosphor blend of 2343, 2212 and 2464 phosphors.

Figure 5:
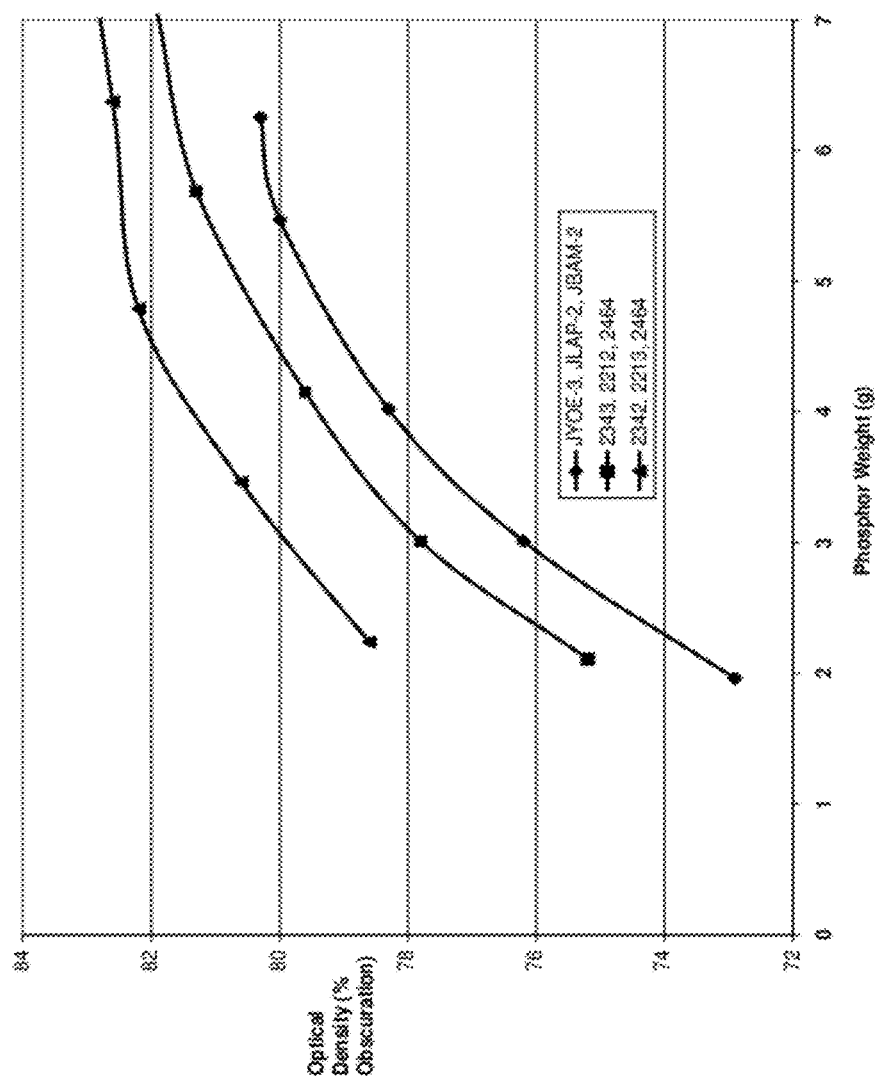
FIG. 5 is a graph of optical density vs. powder weight for various phosphor blends.

FIG. 5 shows the optical density of the coating layers measured on the lamps as a function of powder weight. The optical density is a measure of the degree of scattering of visible light at any given powder weight. If a blend has a higher optical density than another blend at the same powder weight, it indicates that the former scatters more visible light than the latter. This in turn implies that the blend with the higher optical density has a smaller particle size. It is clear from the data presented in FIG. 5 that the Jumbo phosphor blend has the largest particle size compared to the other two blends. This is independent evidence of the larger effective size of these Jumbo phosphors in the actual environment of the fluorescent lamp.

Figure 6:
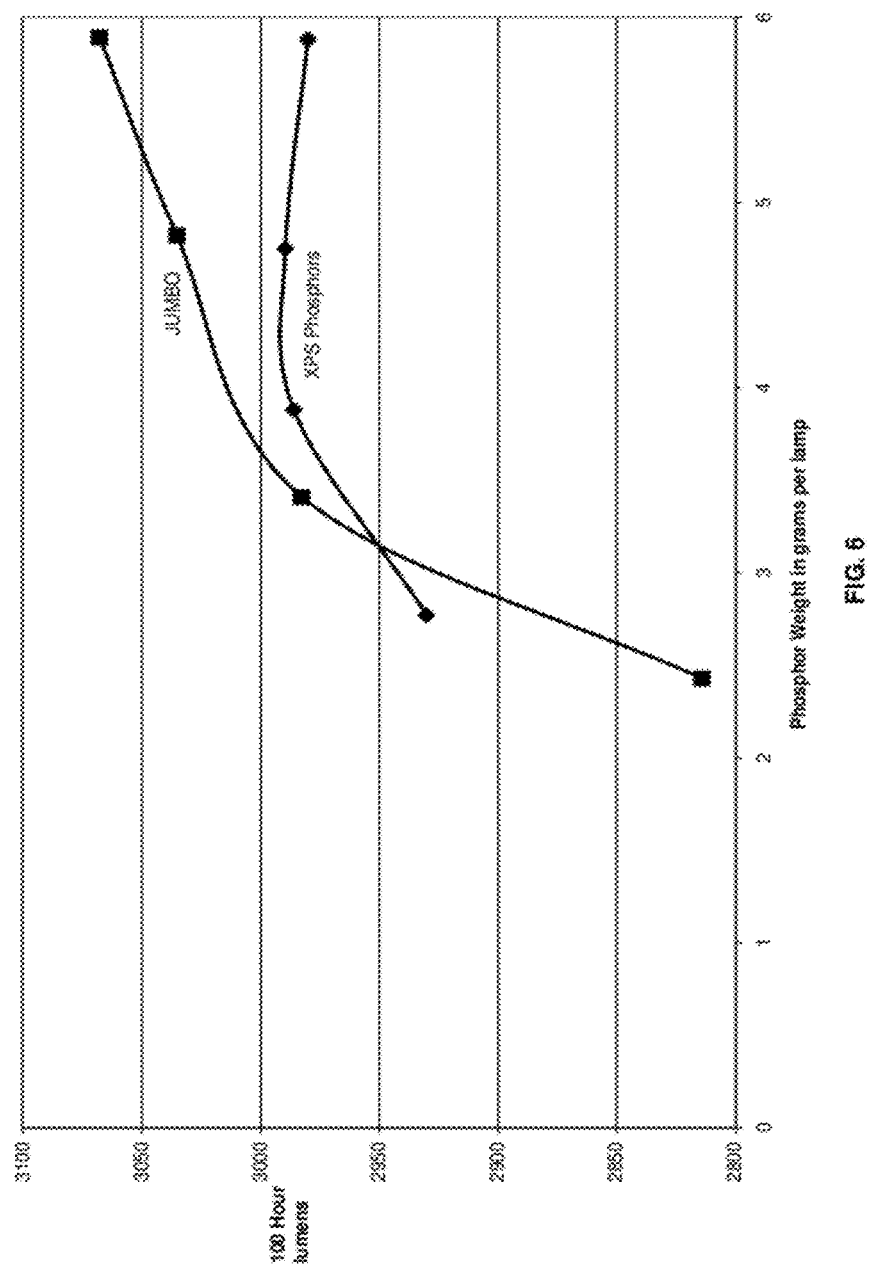
FIG. 6 is a graph of the 100 h lumen output vs. powder weight for a Jumbo phosphor blend vs. a standard blend.

A second powder weight series was performed in the T8 Octron lamp configuration using the same precoat of AOC in each case. The only variable was the phosphor blend that was used. Two blends were tested: one using Jumbo phosphors and one using the standard size rare earth phosphors 2343, 2212 and 2464 for the Octron® XPS lamp. The 100 h color corrected lumens as a function of phosphor blend powder weight is shown in FIG. 6. The particular phosphor lots used in this second test were different from that in FIG. 4.

Several observations can be made from the information presented in FIG. 6. The maximum lumens that can be achieved is highest for the Jumbo phosphor blend. For the standard phosphor blend, the highest lumen that can be achieved is lower than that possible with the Jumbo phosphors. The highest LPW (lumen per watt) or highest lamp efficacy is realized at about 6 g powder weight of Jumbo phosphor blend. (Although it appears that using powder weights greater than 6 g would further increase lumen output and LPW for the Jumbo phosphor blend, it becomes more difficult as a practical matter to apply powder weights heavier than about 6 g.) Merely increasing the powder weight of the smaller-sized phosphor blend to 6 g will not enable it to reach the maximum lumen and LPW levels possible with the Jumbo phosphors. Gains of about 2.5% in lumens and LPW are realized with the Jumbo phosphors relative to the standard size XPS lamp phosphor blend of 2343, 2212 and 2464 type phosphors.

Dual Layer Jumbo Phosphors Vs. Single Layer Jumbo Phosphors

A test was conducted to evaluate the effect of applying the Jumbo phosphors in two layers instead of a single layer. Three groups of lamps were made. The control group used the standard phosphors for the OSRAM SYLVANIA Octron® XPS lamp in a single layer. The first test group used the Jumbo phosphors as a single layer while the other test group used the same Jumbo phosphors but applied as two layers: one layer on top of the other with about equal weights in each layer. Application of dual-layer coatings without intermediate baking of the first layer is well known to practitioners of the art and can be done by one of several methods, including baking the first layer before applying the second layer or by rendering the first layer insoluble by use of appropriate cross linking chemicals in the suspension. The results of this test are shown in Table 1 below.

TABLE 1

|  | LPW enhancement relative to control | |
| --- | --- | --- |
|  | Color Not Corrected % LPW increase | Color Corrected % LPW increase |
| Single layer Jumbo 5.6 g | 2.55 | 2.97 |
| Dual layer Jumbo 3.25 g/3 g | 3.70 | 4.21 |

Unexpectedly, no decrease in lumen output was observed in going from a single layer of Jumbo phosphors to a dual layer Jumbo phosphor approach. In fact, an increase in lumen output is observed by using a dual layer approach. At least an increase of 1% in LPW is obtained with the dual layer method relative to the single layer method. It should be noted that there is a 0.5 g difference in coating weight between the two Jumbo groups in Table 1 with the dual layer total phosphor weight being higher than that in the single Jumbo layer. However, from the data presented in FIGS. 4 and 6, this difference in Jumbo phosphor powder weight is unable to account for the increase in LPW that is observed for the dual layer Jumbo system.

Figure 7:
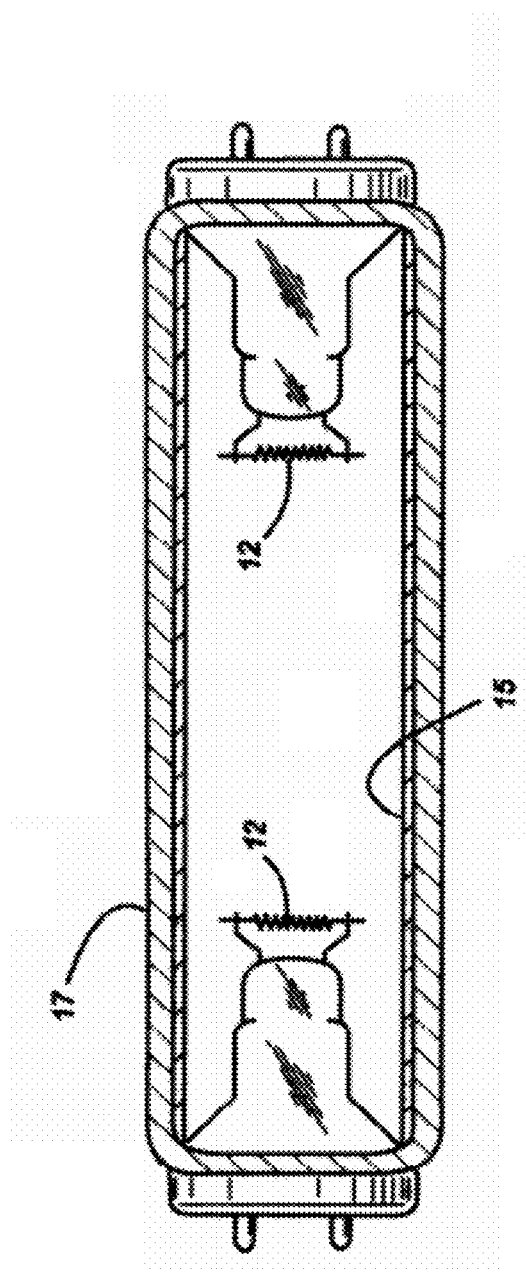
FIG. 7 is a cross-sectional illustration of a fluorescent lamp containing a Jumbo phosphor blend.

FIG. 7 is a cross-sectional illustration of a fluorescent lamp having a phosphor coating containing the Jumbo phosphor blend of this invention. The lamp has a hermetically sealed glass envelope 17. The interior of the envelope 17 is filled with an inert gas such as argon or a mixture of argon and krypton at a low pressure, for example 1-3 torr, and a small quantity of mercury, at least enough to provide a low vapor pressure of mercury during operation. An electrical discharge is generated between electrodes 12 to excite the mercury vapor to generate ultraviolet radiation. A phosphor coating 15 is applied to the interior surface of the envelope 17 to convert at least a portion of the ultraviolet radiation emitted by the low-pressure mercury discharge into a desired wavelength range. The phosphor coating 15 contains the Jumbo phosphor blend which emits a white light (combined red, blue and green emissions) when stimulated by the ultraviolet radiation emitted by the discharge. The phosphor coating may be applied in a single layer or as a dual-layer coating.

Although the above-described Jumbo phosphor blend is particularly useful for fluorescent lamps, it may also be used with other UV-generating light sources such as UV-emitting LEDs. For example, the phosphor blend could be coated on UV-emitting LEDs wherein the wavelengths emitted from the LED range from 180 to 260 nm. Several such UV LEDs could also be arranged in a rectangular/square layout with the necessary thermal management hardware. Coated on each of the UV LEDs or coated on a flat sheet located away from the UV LEDs would be a layer of the Jumbo phosphor blend which would convert the UV radiation from the LEDs to visible radiation.

While there have been shown and described what are at present considered to be preferred embodiments of the invention, it will be apparent to those skilled in the art that various changes and modifications can be made herein without departing from the scope of the invention as defined by the appended claims.

What is claimed is:

1. A phosphor blend consisting of a red-emitting rare earth phosphor, a green-emitting rare earth phosphor, and a blue-emitting rare earth phosphor, wherein the blue-emitting rare earth phosphor is selected from the group consisting of BAM and SCAp, and wherein the median particle size of the red-emitting rare earth phosphor, the green-emitting rare earth phosphor, and the blue-emitting rare earth phosphor is between about 12 to 15 µm.

2. The phosphor blend of claim 1 wherein the red-emitting phosphor is a YOE phosphor and the green-emitting phosphor is at least one of a LAP, a CAT, or a CBT phosphor.

3. The phosphor blend of claim 1 wherein the red-emitting phosphor is a YOE phosphor, the green-emitting phosphor is a LAP phosphor and the blue-emitting phosphor is a BAM phosphor.

4. A fluorescent lamp, comprising: electrodes and a glass envelope having a phosphor coating on an interior surface, the envelope being hermetically sealed and containing an amount of mercury and an inert gas, the phosphor coating containing a phosphor blend consisting of a red-emitting rare earth phosphor, a green-emitting rare earth phosphor, and a blue-emitting rare earth phosphor, wherein the blue-emitting rare earth phosphor is selected from the group consisting of BAM and SCAp, and wherein the median particle size of the red-emitting rare earth phosphor, the green-emitting rare earth phosphor, and the blue-emitting rare earth phosphor is between about 12 to 15 µm.

5. The lamp of claim 4 wherein a powder weight of the phosphor blend is between 5 g and 7 g.

6. The lamp of claim 5 wherein the phosphor coating is applied in a single layer.

7. The lamp of claim 5 wherein the phosphor coating is applied as a dual layer.

8. The lamp of claim 7 wherein a first layer of the dual layer is between 40-60% by weight of the phosphor coating.

9. The lamp of claim 4 wherein the red-emitting phosphor is a YOE phosphor and the green-emitting phosphor is at least one of a LAP, a CAT, or a CBT phosphor.

10. The lamp of claim 4 wherein the red-emitting phosphor is a YOE phosphor, the green-emitting phosphor is a LAP phosphor and the blue-emitting phosphor is a BAM phosphor.

11. The lamp of claim 10 wherein a powder weight of the phosphor blend is between 5 g and 7 g.

12. The lamp of claim 11 wherein the phosphor coating is applied in a single layer.

13. The lamp of claim 11 wherein the phosphor coating is applied as a dual layer.

14. The lamp of claim 13 wherein a first layer of the dual layer is between 40-60% by weight of the phosphor coating.

15. A fluorescent lamp, comprising: electrodes and a glass envelope having a coating on an interior surface, the envelope being hermetically sealed and containing an amount of mercury and an inert gas, the coating consisting of a red-emitting rare earth phosphor, a green-emitting rare earth phosphor, and a blue-emitting rare earth phosphor, wherein the blue-emitting rare earth phosphor is selected from the group consisting of BAM and SCAp, and wherein the median particle size of the red-emitting rare earth phosphor, the green-emitting rare earth phosphor, and the blue-emitting rare earth phosphor is between about 12 to 15 µm.

* * * * *